(12) United States Patent
Xu et al.

(10) Patent No.: US 11,652,600 B2
(45) Date of Patent: May 16, 2023

(54) METHOD, DEVICE AND SYSTEM FOR DETERMINING CODING MODULATION PARAMETER

(71) Applicant: ZTE Corporation, Shenzhen (CN)

(72) Inventors: Jun Xu, Shenzhen (CN); Bo Dai, Shenzhen (CN); Jin Xu, Shenzhen (CN); Zewei Chen, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 288 days.

(21) Appl. No.: 17/199,747

(22) Filed: Mar. 12, 2021

(65) Prior Publication Data
US 2021/0204257 A1 Jul. 1, 2021

Related U.S. Application Data

(63) Continuation of application No. 16/069,289, filed as application No. PCT/CN2017/076176 on Mar. 9, 2017, now Pat. No. 10,986,621.

(30) Foreign Application Priority Data

Jan. 11, 2016 (CN) .......................... 201610017731.6

(51) Int. Cl.
*H04L 5/00* (2006.01)
*H04W 72/232* (2023.01)
(Continued)

(52) U.S. Cl.
CPC ......... *H04L 5/0094* (2013.01); *H04W 72/232* (2023.01); *H04L 1/001* (2013.01);
(Continued)

(58) Field of Classification Search
CPC .. H04L 5/0094; H04W 72/232; H04W 72/23; H04W 72/231
See application file for complete search history.

(56) References Cited

U.S. PATENT DOCUMENTS 10,986,621 B2 * 4/2021 Xu ...................... H04L 1/1819
2010/0310004 A1 12/2010 Li
(Continued)

FOREIGN PATENT DOCUMENTS

CN 102088732 A 6/2011
CN 102215090 A 10/2011
(Continued)

OTHER PUBLICATIONS

"Cellular System Support for Ultra Low Complexity and Low Throughput Internet of Things", Issued on Aug. 2015, 3GPP TR 45.820 V2.0.0 (Aug. 2015) Technical Report, 508 pages.
(Continued)

*Primary Examiner* — Kevin C. Harper
(74) *Attorney, Agent, or Firm* — Cantor Colburn LLP

(57) ABSTRACT

Disclosed are a method, device and system for determining a coding modulation parameter. The method includes: a terminal receives downlink control information from a base station, and determines a coding modulation parameter according to a domain, within the downlink control information, used for determining the coding modulation parameter.

20 Claims, 2 Drawing Sheets

(51) Int. Cl.
  *H04W 72/23* (2023.01)
  *H04L 1/00* (2006.01)
  *H04L 1/1812* (2023.01)
  *H04L 27/26* (2006.01)
(52) U.S. Cl.
  CPC .......... *H04L 1/0003* (2013.01); *H04L 1/1812* (2013.01); *H04L 27/2605* (2013.01); *H04W 72/23* (2023.01)

(56) References Cited

U.S. PATENT DOCUMENTS

| | | |
|---|---|---|
| 2011/0223924 A1 | 9/2011 | Lohr |
| 2012/0182949 A1* | 7/2012 | Aiba .................. H04L 5/0053 370/329 |
| 2013/0010850 A1 | 1/2013 | Li |
| 2013/0308504 A1 | 11/2013 | Nimbalker |
| 2013/0329661 A1 | 12/2013 | Chen et al. |
| 2014/0293881 A1 | 10/2014 | Khoshneivis |
| 2015/0163773 A1 | 6/2015 | Wang |
| 2015/0223216 A1 | 8/2015 | Han et al. |

FOREIGN PATENT DOCUMENTS

| | | |
|---|---|---|
| CN | 102265695 A | 11/2011 |
| CN | 102448122 A | 5/2012 |
| CN | 102550122 A | 7/2012 |
| CN | 102958184 A | 3/2013 |
| CN | 103580776 A | 2/2014 |
| CN | 103687042 A | 3/2014 |
| CN | 104144513 A | 11/2014 |
| WO | 2011122900 A2 | 10/2011 |
| WO | 2014029108 A1 | 2/2014 |
| WO | 2014032544 A1 | 3/2014 |

OTHER PUBLICATIONS

"Evolved Universal Terrestrial Radio Access (E-UTRA) Physical layer procedured", Jun. 2015, 3GPP TS 36.213 V10.13.0 (Jun. 2015), Technical Specification, 128 pages.
"TBS optimization for NCT", Apr. 15, 2013, 3GPP TSG RAN WG1 Meeting #72bis R1-130973, 3 pages.
"Transport block size optimization for NCT", Apr. 15, 2013, 3GPP TSG RAN WG1 Meeting #72bis R1-131159, 8 pages.
Chinese Office Action for corresponding application 2016100177316 filed Jan. 11, 2016; dated Dec. 4, 2019.
Chinese Search Report for corresponding application 2016100177316 filed Jan. 11, 2016; dated Dec. 4, 2019.
English Translation of the Written Opinion in International Application No. PCT/CN2016/076176, dated May 31, 2017, 3 pages.
International Search Report in International Application No. PCT/CN2016/076176, dated May 31, 2017, 2 pages.
Qualcomm Incorporated, "SU-MIMO Demodulation Aspects", 3GPP TSG-RAN WG4 Meeting #72bis Singapore, Oct. 6-10, 2014, R4-145714.

* cited by examiner

METHOD, DEVICE AND SYSTEM FOR DETERMINING CODING MODULATION PARAMETER

CROSS REFERENCE TO RELATED APPLICATION

This application is a continuation of U.S. patent application Ser. No. 16/069,289, filed on Jul. 11, 2018, the contents of which are herein incorporated by reference in their entirety.

TECHNICAL FIELD

The disclosure relates, but is not limited, to an Internet of Things (TOT) technology, and in particular to a method, device and system for determining a coding modulation parameter.

BACKGROUND

In a wireless communication system, different users use multiplexing access technologies to share wireless communication resources. The commonly-used multiplexing access technologies include Frequency Division Multiplexing Access (FDMA) technology, Time Division Multiplexing Access (TDMA) technology, Code Division Multiplexing Access (CDMA) technology, Orthogonal Frequency Division Multiplexing Access (OFDMA) technology, and Single Carrier-Frequency Division Multiplexing Access (SC-FDMA) technology.

In a Long Term Evolution (LTE) system in Release-12, an uplink and a downlink adopt the SC-FDMA technology and the OFDMA technology, respectively. In a LTE system in Release-13, the study of a Narrow Band-Internet of Things (NB-IOT) technology is started. Uplink transmission of the NB-IOT technology relates to two multiplexing access technologies, namely the FDMA technology based on Gaussian Filtered Minimum Shift Keying (GMSK) modulation and the SC-FDMA technology. The FDMA technology based on the GMSK modulation has a characteristic of low Peak to Average Power Ratio (PAPR), which is beneficial to improving a power amplification efficiency, thereby saving the cost of a UE and ensuring the coverage. The FDMA technology based on the GMSK modulation has an advantage of being insensitive to a timing precision, but has a disadvantage of low spectrum efficiency. The SC-FDMA technology has an advantage of high spectrum efficiency.

In an LTE-Advanced (LTE-A) system, a SC-FDMA technology is adopted in an uplink, and the OFDMA technology is adopted in a downlink. The LTE system and the LTE-A system have become the most popular fourth generation mobile communication systems in the world.

A Machine Type Communication (MTC) User Equipment (UE), also called Machine to Machine (M2M) UE, is the primary form of applications of IOT at present. Several technologies applied to Cellular Internet of Things (C-IOT) are disclosed in the 3rd Generation Partnership Project (3GPP) technical report TR45.820V200, in which a Narrowband LTE (NB-LTE) technology is most significant. A system bandwidth of the NB-LTE system is 200 kHz, which is as same as a channel bandwidth of the Global system for Mobile Communication (GSM) system, thereby bringing great convenience to the NB-LTE system to reuse a GSM frequency spectrum and decrease a mutual interference with a GSM channel. A transmitting bandwidth and a downlink subcarrier interval of the NB-LTE system are respectively 180 kHz and 15 kHz, which are as same as the bandwidth of a Physical Resource Block (PRB) and the subcarrier interval of the LTE system respectively.

In the LTE system, a base station sends downlink data to a UE through a Physical Downlink Shared Channel (PDSCH), and the UE sends uplink data to the base station through a Physical Uplink Shared Channel (PUSCH). Control signaling to be transmitted in the uplink has an Acknowledgement/Negative Acknowledgement (ACK/NACK) message, and three forms of reflecting downlink physical Channel State Information (CSI); here, the three forms are Channel Quality Indicator (CQI), Precoding Matrix Indicator (PMI), and Rank Indicator (RI). The UE reports the CSI to the base station through a Physical Uplink Control Channel (PUCCH) or the PUSCH.

The base station schedules the UE according to the CSI. The base station determines a resource size, a frequency domain position, a Modulation and Coding Scheme (MCS), the number of layers of Multiple-Input Multiple-Output (MIMO) spatial multiplexing and a precoding matrix for transmitting the downlink data, and sends downlink data and Downlink Control Information (DCI) on NPRB PRBs indicating the frequency domain position to the UE. The DCI carries $I_{MCS}$ information. A piece of $I_{MCS}$ information essentially corresponds to a combination of MCSs, so the UE can obtain the MCS of the downlink data, and decode and demodulate the PDSCH data according to the determined MCS.

In the LTE system, as a replacement of the Rate Matching (RM) algorithm in 3GPP Release-6, the RM based on a Circular Buffer (CB) provides a method being capable of simply generating a puncturing pattern with good performance. Bits which are selected for transmission can be read out from any position of the CB. If the end of the buffer is reached, the remaining part of data can be read from the starting position of the CB until all the L bits are read out. Different positions in the CB can be specified as the starting position for reading a Hybrid Automatic Repeat request (HARQ) data package in each transmission. The definition of a Redundancy Version (RV) determines multiple starting positions of reading the HARQ data package in the CB, so the value of the RV determines the specific starting position of reading the HARQ data package in the CB in this transmission. In the 3GPP system, an HARQ process based on CB rate matching defines four circular RVs (RV=0, 1, 2, 3). A sub-package with a length of L bits in each HARQ retransmission is composed of L bits which are selected clockwise from the starting position defined by the RV.

However, the LTE/LTE-A system and the NB-IOT system have the following differences: bandwidths, multi-access modes, coding modes and resource allocation of the NB-IOT system are greatly different from those in the LTE/LTE-A system, for example, single-tone multiple access and multi-tone multiple access are introduced in the uplink, tail biting convolutional codes instead of Turbo codes are used in the downlink, so a method for determining a coding modulation parameter in the LTE system and the LTE-A system cannot be applied in the NB-IOT system. In the related technology, there is no method for determining the coding modulation parameter in the NB-IOT system, which hinders correct coding and decoding. Meanwhile, the fifth generation mobile communication system (5G) has the similar problem. The disclosure is also applied to a New Radio Access (NR) system of the 5G.

SUMMARY

The following is an overview of the theme elaborated in this application. The overview is not intended to limit the protection scope of the claims.

In order to solve the above problem, the disclosure provides a method, device and system for determining a coding modulation parameter, which can determine the coding modulation parameter of the NB-IOT system.

To this end, the disclosure provides a method for determining a coding modulation parameter, which includes that:

a User Equipment (UE) receives Downlink Control Information (DCI) from a base station, and determines a coding modulation parameter according to a field for determining the coding modulation parameter, in the DCI.

In an embodiment, the coding modulation parameter may include at least one of the following: Transmission Block Size (TBS), a Modulation and Coding Scheme (MCS), or predefined transmission information;

the field for determining the coding modulation parameter may include:

a resource allocation field; or one of an MCS field, a TBS indication field, a joint coding field of the MCS and the predefined transmission information, and a joint coding field of TBS information and the predefined transmission information; or a resource allocation field and one of an MCS field, a TBS indication field, a joint coding field of the MCS and the predefined transmission information, and a joint coding field of TBS information and the predefined transmission information;

the resource allocation field is used for providing information about Resource Unit (RU)-based resource allocation for a Transmission Block (TB); the MCS field is used for indicating the MCS; the TBS indication field is used lonely or together with a number of resource elements for determining the TBS; the TBS information is used for determining the TBS; and an RU may include two-dimensional time-frequency resources including Nsc consecutive frequency-domain subcarriers and Nsym consecutive time-domain Orthogonal Frequency Division Multiplexing (OFDM) symbols; the RU includes Nsc×Nsym resource elements, where the Nsc and the Nsym are integers greater than or equal to 1.

In an embodiment, the predefined transmission information may include at least one of the following: a number of repetitions (Nrep) or a Redundancy Version (RV); where the RV is an element in a set {0, 1} or a set {0, 1, 2, 3}.

In an embodiment, the operation that the UE determines a coding modulation parameter according to a field for determining the coding modulation parameter, in the DCI may include one of the following.

Manner 1:

the UE determines that the field for determining the coding modulation parameter includes the resource allocation field and the MCS field;

the UE determines a number of RUs occupied by the TB according to the resource allocation field; and the UE determines, according to the MCS field, or the number of RUs occupied by the TB, or the MCS field and the number of RUs occupied by the TB, at least one of the following: the TBS, the Nrep, or the RV.

Manner 2:

the UE determines that the field for determining the coding modulation parameter includes the resource allocation field and the TBS indication field;

the UE determines a number of RUs occupied by the TB according to the resource allocation field; and the UE determines, according to the TBS indication field, or the number of RUs occupied by the TB, or the TBS indication field and the number of RUs occupied by the TB, at least one of the following: the MCS, the Nrep, or the RV.

Manner 3:

the UE determines that the field for determining the coding modulation parameter includes the resource allocation field and the joint coding field of the MCS and the predefined transmission information;

here, the joint coding field of the MCS and the predefined transmission information at least includes the following characteristics:

1) the predefined transmission information includes the RV; RVs corresponding to N1 MCSs are always equal to 0; RVs corresponding to N2 MCSs have at least two values; and a number of all the MCSs in the MCS field is (N1+N2); or, 2) the predefined transmission information includes the Nrep; the smaller the MCS index, the larger the Nrep corresponding to the MCS index; the larger the MCS index, the smaller the Nrep corresponding to the MCS index; or 3) the predefined transmission information includes the RV and the Nrep; the smaller the MCS index, the larger the Nrep corresponding to the MCS index and the smaller the number of RVs corresponding to the MCS index; the larger the MCS index, the smaller the Nrep corresponding to the MCS index and the larger the number of RVs corresponding to the MCS index;

the UE determines a number of RUs occupied by the TB according to the resource allocation field; and the UE determines, according to the joint coding field of the MCS and the predefined transmission information, or the number of RUs occupied by the TB, or the joint coding field of the MCS and the predefined transmission information and the number of RUs occupied by the TB, at least one of the following: the TBS, the Nrep, or the RV.

Manner 4:

the UE determines that the field for determining the coding modulation parameter includes the resource allocation field and the joint coding field of the TBS information and the predefined transmission information;

here, the joint coding field of the TBS information and the predefined transmission information at least includes the following characteristics:

1) the predefined transmission information includes the RV, RVs corresponding to N1 TBSs in the TBS indication field are always equal to 0; RVs corresponding to N2 TBSs in the TBS indication field at least have two values; and a number of all the TBSs in the TBS indication field is (N1+N2); or, 2) the predefined transmission information includes the Nrep; the smaller the TBS, the larger the Nrep corresponding to the TBS; the larger the TBS, the smaller the Nrep corresponding to the TBS; or 3) the predefined transmission information includes the RV and the Nrep; the smaller the TBS, the larger the Nrep corresponding to the TBS and the smaller the number of RVs corresponding to the TBS; the larger the TBS, the smaller the Nrep corresponding to the TBS and the larger the number of RVs corresponding to the TBS;

the UE determines a number of RUs occupied by the TB according to the resource allocation field; and the UE determines, according to the joint coding field of the TBS indication field and the predefined transmission information, or the number of RUs occupied by the TB, or the joint coding field of the TBS indication field and the predefined transmission information and the number of RUs occupied by the TB, at least one of the following: the TBS, the Nrep, or the RV;

here, the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

In an embodiment, the manner 1 may include that:

the UE determines the number of RUs occupied by the TB according to the resource allocation field;

the UE determines a TBS index and at least one of the Nrep or the RV, according to the MCS field; and the UE determines the TBS according to the TBS index and the number of RUs occupied by the TB.

In an embodiment, the operation that the UE determines TBS index and at least one of the Nrep or the RV according to the MCS field may include that:

the UE searches for the TBS index and at least one of the Nrep or the RV corresponding to the MCS field, in a first preset mapping relationship among an MCS index, the TBS index and at least one of the Nrep or the RV.

In an embodiment, the first preset mapping relationship may be a second modulation and TBS index table including a number L1 of combinations of modulation schemes and TBS indexes which are in a first modulation and TBS index table; where L1 is an integer which is less than or equal to 11, or less than or equal to 8.

In an embodiment, the method further may include that: before searching in the first preset mapping relationship, the UE determines the second modulation and TBS index table according to at least one of the following: link directions, multiple access modes, size of subcarrier interval, application scenarios, protocol versions, a number of transmissions, or carrier frequency.

Here, the application scenarios include Enhanced Mobile Broadband (eMBB) of the fifth generation mobile communication system (5G), Ultra Reliable and Low Latency Communication (URLLC) of 5G, and Massive Machine Type Communication (mMTC).

In an embodiment, the operation that the UE determines the TBS according to the TBS index and the number of RUs occupied by the TB may include that:

the UE searches for the TBS corresponding to the TBS index and the number of RUs occupied by the TB in a second preset mapping relationship among the TBS index, the number of RUs occupied by the TB and the TBS.

In an embodiment, the operation that the UE determines the TBS index and at least one of the Nrep or the RV according to the MCS field may include that:

the UE determines joint coding information of the TBS index and the predefined transmission information according to the MCS field, and the UE determines, according to the joint coding information of the TBS index and the predefined transmission information, at least one of the following: the TBS index, the Nrep, or the RV.

In an embodiment, the joint coding information of the TBS index and the predefined transmission information may include at least one of the following characteristics:

when the predefined transmission information in the joint coding information of the TBS index and the predefined transmission information is the RV, RVs corresponding to N1 TBS indexes are 0, and RVs corresponding to N2 TBS indexes have at least two values;

when the predefined transmission information in the joint coding information of the TBS index and the predefined transmission information is the Nrep, the smaller the TBS index, the larger the Nrep corresponding to the TBS index; the larger the TBS index, the smaller the Nrep corresponding to the TBS index; or when the predefined transmission information in the joint coding information of the TBS index and the predefined transmission information includes the RV and the Nrep, the smaller the TBS index, the larger the Nrep corresponding to the TBS index, and the smaller the number of RVs corresponding to the TBS index; the larger the TBS index, the smaller the Nrep corresponding to the TBS index, and the larger the number of RVs corresponding the TBS index.

In an embodiment, when the UE determines that the TBS index is less than or equal to a preset value, there is one RV supported by the UE; when the UE determines that the TBS index is greater than the preset value, there are two or more than two RVs supported by the UE.

In an embodiment, the operation that the UE determines the number of RUs occupied by the TB according to the resource allocation field may include that:

the UE determines the number of resource elements occupied by the TB, or the number of time-domain symbols or the number of time-domain OFDM symbols according to at least one of the following:

search space, DCI format, Cyclic Redundancy Check (CRC) scrambling mode corresponding to the DCI, coverage mode, information about the Nrep in high-level configuration signaling, information about the Nrep in a broadcast message, or multiple access mode; and the UE determines the number of RUs according to the number of resource elements or the number of time-domain symbols or the number of time-domain OFDM symbols.

In an embodiment, the RU may include one of the following characteristics:

the number of resource elements included in the RU and the number of time-domain symbols occupied by the RU, and the number of resource elements included in the RU and time-domain symbols occupied by the RU are the same in both modes for the UE, comprising a single-tone multiple access mode and a multi-tone multiple access mode, and at least one of the number of resource elements or the number of time-domain symbols is a fixed value or determined according to a semi-static high-level configuration parameter;

the number of resource elements included in the RU and the number of time-domain symbols occupied by the RU are different in both modes for the UE, comprising the single-tone multiple access mode and the multi-tone multiple access mode; and, the number of resource elements and the number of time-domain symbols in each of the single-tone multiple access mode and the multi-tone multiple access mode are fixed values or determined according to the semi-static high-level configuration parameter;

or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;

or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;

or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;

or the number of resource elements or the number of time-domain symbols in each of the single-tone multiple access mode and the multi-tone multiple access mode is a common divisor of X, where the X is a positive integer greater than a preset threshold.

In an embodiment, the RU is a time-frequency resource block including Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;

or the RU is a time-frequency resource block including Nsc frequency-domain subcarriers and Nre0/Nsc time-domain symbols, where the Nre0 is the number of resource elements, which is a fixed value or determined according to the semi-static high-level configuration parameter.

In an embodiment, the Nsc is a power of 2, or the product of a prime number less than 10 and a power of 2;

the Nsym0 is the product of a prime number less than 10 and a power of 2, or a power of 2.

In an embodiment, the Nrep is the product of the prime number less than 10 and the power of 2, or a power of 2.

In an embodiment, the Nsc is an element in a subset of a set {1, 2, 3, 4, 6, 8, 12}.

In an embodiment, the Nsc is an element in a subset of a set {1, 2, 3, 4, 6, 12};

the number of time-domain symbols in each of the single-tone multiple address mode and the multi-tone multiple address mode is 144K1, where the K1 is an integer greater than or equal to 1.

In an embodiment, the Nsc is an element in a subset of a set {1, 2, 3, 4, 6, 8, 12}, and the subset includes 8;

the number of time-domain symbols in the single-tone multiple address mode is 144×K2, and the number of time-domain symbols in the multi-tone multiple address mode is 288×K3, where the K2 and the K3 are integers greater than or equal to 1.

In an embodiment, the K1 is equal to 1, the K2 is equal to 1, and the K3 is equal to 1;

or the K1 is equal to 5, the K2 is equal to 5, and the K3 is equal to 5;

or the K1 is equal to 10, the K2 is equal to 10, and the K3 is equal to 10.

In an embodiment, the fixed value of the number of time-domain symbols in the single-tone multiple address mode or the multi-tone multiple address mode is different varies with a coverage level;

or, the number of time-domain symbols in the single-tone multiple address mode or the multi-tone multiple address mode is read from the first set when the coverage level is less than a preset level, and is read from the second set when the coverage level is greater than or equal to the preset level.

In an embodiment, the number of RUs is one of the following:

the product of a prime number less than 10 and a power of 2, the power of 2, and a natural number from 1 to Nmax, where the Nmax is an integer greater than or equal to 1.

In an embodiment, the resource allocation field includes at least one of the following:

information about the frequency-domain subcarriers allocated to the TB, information about the number of RUs included in the TB, or information about the time-domain symbols allocated to the TB.

The disclosure also provides a method for determining a coding modulation parameter, which comprises:

a base station sends Downlink Control Information (DCI) to a User Equipment (UE); the DCI includes a field for determining a coding modulation parameter.

In an embodiment, the field for determining the coding modulation parameter may include:

a resource allocation field; or one of an Modulation and Coding Scheme (MCS) field, a Transmission Block Size (TBS) indication field, a joint coding field of MCS and predefined transmission information, and a joint coding field of TBS information and predefined transmission information; or a resource allocation field and one of an Modulation and Coding Scheme (MCS) field, a Transmission Block Size (TBS) indication field, a joint coding field of MCS and predefined transmission information, and a joint coding field of TBS information and predefined transmission information.

Here, the resource allocation field is used for providing information about Resource Unit (RU)-based resource allocation for a Transmission Block (TB); the MCS field is used for indicating the MCS; the TBS indication field is used lonely or together with a number of resource elements for determining the TBS; the TBS information is used for determining the TBS.

An RU includes two-dimensional time-frequency resources including Nsc consecutive frequency-domain subcarriers and Nsym consecutive time-domain Orthogonal Frequency Division Multiplexing (OFDM) symbols; the RU includes Nsc×Nsym resource elements, where the Nsc and the Nsym are integers greater than or equal to 1.

In an embodiment, the predefined transmission information includes at least one of the following: a number of repetitions (Nrep) or a Redundancy Version (RV); where the RV is an element in a set {0, 1} or a set {0, 1, 2, 3}.

The disclosure also provides a User Equipment (UE), which includes that:

a receiving module, configured to receive Downlink Control Information (DCI) from a base station; and a determining module, configured to determine a coding modulation parameter according to a field for determining the coding modulation parameter, in the DCI.

In an embodiment, the determining module is further configured to determine the coding modulation parameter using one of the following manners.

Manner 1:

determining that the field for determining the coding modulation parameter includes a resource allocation field and a Modulation and Coding Scheme (MCS) field;

determining a number of Resource Units (RUs) occupied by a Transmission Block (TB) according to the resource allocation field; and determining, according to the MCS field, or the number of RUs occupied by the TB, or the MCS field and the number of RUs occupied by the TB, at least one of the following: Transmission Block Size (TBS), a number of repetitions (Nrep), or a Redundancy Version (RV).

Manner 2:

determining that the field for determining the coding modulation parameter includes a resource allocation field and a TBS indication field;

determining a number of RUs occupied by a TB according to the resource allocation field; and determining, according to the TBS indication field, or the number of RUs occupied by the TB, or the TBS indication field and the number of RUs occupied by the TB, at least one of the following: an MCS, an Nrep, or an RV.

Manner 3:

determining that the field for determining the coding modulation parameter includes a resource allocation field and a joint coding field of an MCS and predefined transmission information;

the joint coding field of the MCS and the predefined transmission information at least includes that:

the predefined transmission information includes an RV; RVs corresponding to N1 MCSs are always equal to 0; RVs corresponding to N2 MCSs have at least two values; and a number of all the MCSs in an MCS field is (N1+N2); or, the predefined transmission information includes an Nrep; the smaller the MCS index, the larger the Nrep corresponding to the MCS index; the larger the MCS index, the smaller the Nrep corresponding to the MCS index; or the predefined transmission information includes the RV and the Nrep; the smaller the MCS index, the larger the Nrep corresponding to the MCS index and the smaller a number of RVs corresponding to the MCS index; the larger the MCS index, the smaller the Nrep corresponding to the MCS index and the larger the number of RVs corresponding to the MCS index;

determining a number of RUs occupied by a TB according to the resource allocation field; and determining, according to the joint coding field of the MCS and the predefined transmission information, or the number of RUs occupied by the TB, or the joint coding field of the MCS and the predefined transmission information and the number of RUs occupied by the TB, at least one of the following: a TBS, the Nrep, or the RV.

Manner 4:

determining that the field for determining the coding modulation parameter includes a resource allocation field and a joint coding field of TBS information and predefined transmission information;

the joint coding field of the TBS information and the predefined transmission information at least includes that:

the predefined transmission information includes an RV, RVs corresponding to N1 TBSs in the TBS indication field are always equal to 0; RVs corresponding to N2 TBSs in the TBS indication field at least have two values; and a number of all the TBSs in the TBS indication field is (N1+N2); or, the predefined transmission information includes an Nrep; the smaller the TBS, the larger the Nrep corresponding to the TBS; the larger the TBS, the smaller the Nrep corresponding to the TBS; or the predefined transmission information includes an RV and an Nrep; the smaller the TBS, the larger the Nrep corresponding to the TBS and the smaller the number of RVs corresponding to the TBS; the larger the TBS, the smaller the Nrep corresponding to the TBS and the larger the number of RVs corresponding to the TBS;

determining a number of RUs occupied by a TB according to the resource allocation field; and determining, according to the joint coding field of the TBS indication field and the predefined transmission information, or the number of RUs occupied by the TB, or the joint coding field of the TBS indication field and the predefined transmission information and the number of RUs occupied by the TB, at least one of the following: the TBS, the Nrep, or the RV;

the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

In an embodiment, the determining module is further configured to:

determine a number of RUs occupied by a TB according to a resource allocation field;

determine an TBS index and at least one of an Nrep or an RV according to an MCS field; and determine a TBS according to the TBS index and the number of RUs occupied by the TB.

In an embodiment, the determining module is further configured to:

determine a number of RUs occupied by a TB according to a resource allocation field;

search for a TBS index and at least one of an Nrep or an RV corresponding to an MCS field in a first preset mapping relationship among an MCS index, a TBS index and at least one of the Nrep or the RV; and determine a TBS according to the TBS index and the number of RUs occupied by the TB.

In an embodiment, the determining module is further configured to:

determine a number of RUs occupied by a TB according to a resource allocation field;

determine at least one of the following according to an MCS field: a TBS index, an Nrep, or an RV; and search for a TBS corresponding to the TBS index and the number of RUs in a second preset mapping relationship among the TBS index, the number of RUs and the TBS.

In an embodiment, the determining module is further configured to:

determine a number of RUs occupied by a TB according to a resource allocation field;

determine a joint coding information of a TBS index and predefined transmission information according to an MCS field;

determine according to the joint coding information of the TBS index and the predefined transmission information at least one of the following: the TBS index, an Nrep, or an RV; and determine a TBS according to the TBS index and the number of RUs occupied by the TB.

In an embodiment, the determining module is further configured to:

determine a number of resource elements occupied by a TB or a number of time-domain symbols or a number of time-domain OFDM symbols according to at least one of the following: search space, DCI format, Cyclic Redundancy Check (CRC) scrambling mode corresponding to the DCI, coverage mode, information about the Nrep in high-level configuration signaling, information about the Nrep in a broadcast message, or multiple access mode; and determine the number of RUs according to the number of resource elements or the number of time-domain symbols or the number of time-domain OFDM symbols.

The disclosure also provides a base station, which includes that:

a sending module, configured to send Downlink Control Information (DCI) to a User Equipment (UE), the DCI includes a field for determining a coding modulation parameter.

The disclosure also provides a system for determining a coding modulation parameter, which includes that: any of the base station described above and any of the UE described above.

Further, the disclosure also provides a computer readable storage medium, in which computer executable instructions are stored; the computer executable instructions are used for performing a method for determining a coding modulation parameter according to any one of embodiments above.

Compared with the related technology, the technical solutions of the disclosure include that: the UE receives DCI from the base station and the UE determines the coding modulation parameter according to the field for determining the coding modulation parameter in the DCI. Through the technical solutions, the coding modulation parameter is determined according to the field for determining the coding modulation parameter in the DCI, so that the determining of the coding modulation parameter of the NB-IOT system is implemented.

In an embodiment, under the condition of maintaining compatibility, the method of joint coding improves the performance of retransmission or repetition while reducing signaling overhead as much as possible.

Other characteristics and advantages of the disclosure will be elaborated in the following specification, and partly become apparent in the specification or understood by implementing the disclosure. The objectives and other advantages of the disclosure can be achieved and obtained by means of the structures specified in the specification, the claims and the accompanying drawings.

Other aspects can be understood after the accompanying drawings and detailed descriptions are read and understood.

BRIEF DESCRIPTION OF DRAWINGS

The accompanying drawings described herein are intended to provide a further understanding of the disclosure, and constitute a part of the application. Schematic embodiments of the disclosure and description thereof are used to explain the disclosure, and do not mean to improperly limit to the disclosure. In the accompanying drawings.

DETAILED DESCRIPTION

Herein, the disclosure will be described in detail with reference to the accompanying drawings and in conjunction with embodiments. It is to be noted that the embodiments and the features in the embodiments of the application can be combined with each other without conflict.

It is to be noted that the terms like "first", "second" and the like in the specification, the claims and the accompanying drawings of the disclosure are used for differentiating similar objects and do not necessarily describe a specific order or a sequence.

Figure 1:
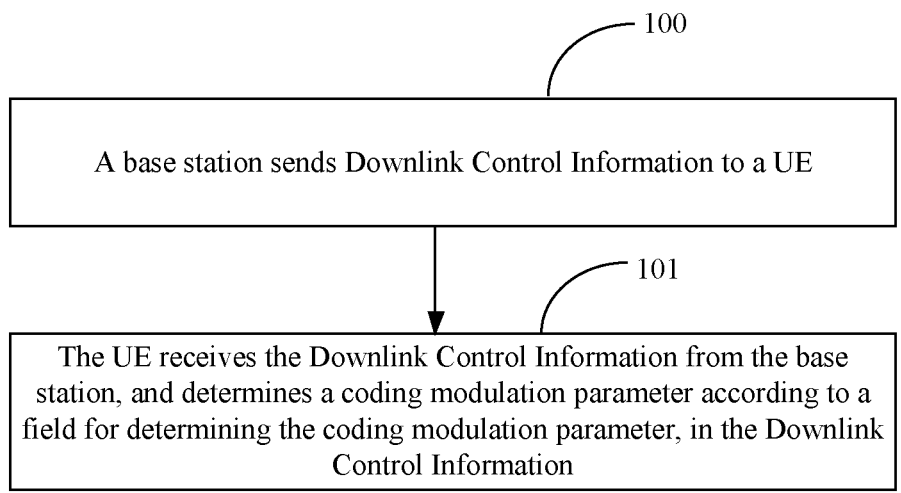
FIG. 1 is a flowchart of a method for determining a coding modulation parameter according to the disclosure.

Referring to FIG. 1, the disclosure provides a method for determining a coding modulation parameter, which includes the following operations.

At S100, a base station sends Downlink Control Information (DCI) to a User Equipment (UE).

In this operation, the DCI includes a field for determining the coding modulation parameter.

Herein, the coding modulation parameter may include at least one of the following: Transmission Block Size (TBS), a Modulation and Coding Scheme (MCS), or predefined transmission information.

The field for determining the coding modulation parameter may include:

a resource allocation field; or one of an MCS field, a TBS indication field, a joint coding field of the MCS and the predefined transmission information, and a joint coding field of TBS information and the predefined transmission information; or a resource allocation field and one of an MCS field, a TBS indication field, a joint coding field of the MCS and the predefined transmission information, and a joint coding field of TBS information and the predefined transmission information.

Herein, the predefined transmission information includes at least one of the following: a number of repetitions (Nrep) or a Redundancy Version (RV).

Herein, the Nrep is an integer greater than or equal to 1, and the RV is an element in a set {0, 1} or a set {0, 1, 2, 3}.

Herein, the number of repetitions (Nrep) is the product of a prime number less than 10 and a power of 2, or a power of 2.

Herein, the resource allocation field is used for providing information about Resource Unit (RU)-based resource allocation for a Transmission Block (TB).

Herein, the resource allocation field comprises at least one of the following:

information about the frequency-domain subcarriers allocated to the TB, information about the number of RUs comprised in the TB, or information about the time-domain symbols allocated to the TB.

Herein, an RU may include two-dimensional time-frequency resources including Nsc consecutive frequency-domain subcarriers and Nsym consecutive time-domain Orthogonal Frequency Division Multiplexing (OFDM) symbols; each RU includes Nsc×Nsym resource elements, where the Nsc and the Nsym are integers greater than or equal to 1.

The RU may include one of the following characteristics:

the number of resource elements included in the RU and the number of time-domain symbols occupied by the RU, and the number of resource elements included in the RU and time-domain symbols occupied by the RU are the same in both modes for the UE, such as, a single-tone multiple access mode and a multi-tone multiple access mode, and at least one of the number of resource elements or the number of time-domain symbols is a fixed value or determined according to a semi-static high-level configuration parameter;

the number of resource elements included in the RU and the number of time-domain symbols occupied by the RU are different in both modes for the UE, such as, the single-tone multiple access mode and the multi-tone multiple access mode; and, the number of resource elements and the number of time-domain symbols in each of the single-tone multiple access mode and the multi-tone multiple access mode are fixed values or determined according to the semi-static high-level configuration parameter;

or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;

or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;

or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;

or the number of resource elements or the number of time-domain symbols in each of the single-tone multiple access mode and the multi-tone multiple access mode is a common divisor of X, where the X is a positive integer greater than a preset threshold.

Herein, the RU is a time-frequency resource block including Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;

or the RU is a time-frequency resource block including Nsc frequency-domain subcarriers andNre0/Nsc time-domain symbols; where the Nre0 is the number of resource elements, which is a fixed value or determined according to the semi-static high-level configuration parameter.

Herein, the Nsc is a power of 2, or the product of a prime number less than 10 and a power of 2. The Nsym0 is the product of a prime number less than 10 and a power of 2, or a power of 2.

Herein, the Nsc is an element in a subset of a set {1, 2, 3, 4, 6, 8, 12}.

Herein, the Nsc is an element in a subset of a set {1, 2, 3, 4, 6, 12};

the number of time-domain symbols in each of the single-tone multiple address mode and the multi-tone multiple address mode is 144K1, where the K1 is an integer greater than or equal to 1.

Or, Nsc is an element in a subset of a set {1, 2, 3, 4, 6, 8, 12}, and the subset comprises 8;

the number of time-domain symbols in the single-tone multiple address mode is 144×K2, and the number of time-domain symbols in the multi-tone multiple address mode is 288×K3, where the K2 and the K3 are integers greater than or equal to 1.

Herein, the K1 is equal to 1, the K2 is equal to 1, and the K3 is equal to 1;

or the K1 is equal to 5, the K2 is equal to 5, and the K3 is equal to 5;

or the K1 is equal to 10, the K2 is equal to 10, and the K3 is equal to 10.

Herein, the fixed value of the number of time-domain symbols in the single-tone multiple address mode or the multi-tone multiple address mode is different varies with a coverage level;

or, the number of time-domain symbols in the single-tone multiple address mode or the multi-tone multiple address mode is read from the first set when the coverage level is less than a preset level, and is read from the second set when the coverage level is greater than or equal to the preset level.

Herein, the MCS field is used for indicating the MCS.

Herein, the TBS indication field is used lonely or together with a number of resource elements for determining the TBS.

Herein, the TBS information is used for determining the TBS.

Herein, the joint coding field of the MCS and the predefined transmission information is using an index to indicate the MCS and the predefined transmission information; the joint coding field of the TBS information and the predefined transmission information is using an index to indicate the TBS information and the predefined transmission information.

Herein, when the predefined transmission information in the joint coding field of the MCS and the predefined transmission information or the joint coding field of the TBS information and the predefined transmission information is the RV, RVs corresponding to N1 MCSs are equal to 0, and the RVs corresponding to N2 MCSs may be the same or different.

When the predefined transmission information in the joint coding field of the MCS and the predefined transmission information or the joint coding field of the TBS information and the predefined transmission information is the Nrep, the smaller the TBS, the larger the Nrep corresponding to the TBS; the larger the TBS, the smaller the Nrep corresponding to the TBS.

When the predefined transmission information in the joint coding field of the MCS and the predefined transmission information or the joint coding field of the TBS information and the predefined transmission information comprises the RV and the Nrep, the smaller the MCS index or the TBS information, the larger the Nrep corresponding to the MCS index or the TBS information, and the smaller the number of RVs corresponding to the MCS index or the TBS information; the larger the MCS index or the TBS information, the smaller the Nrep corresponding to the MCS index or the TBS information, and the larger the number of RVs corresponding to the MCS index or the TBS information.

At S101, the UE receives the DCI from the base station, and the UE determines the coding modulation parameter according to the field for determining the coding modulation parameter in the DCI.

Herein, the operation that the UE determines the coding modulation parameter according to the field for determining the coding modulation parameter in the DCI comprises one of the following:

Manner 1:

The UE determines that the field for determining the coding modulation parameter includes the resource allocation field and the MCS field;

the UE determines a number of RUs occupied by the TB according to the resource allocation field; and the UE determines, according to the MCS field, or the number of RUs occupied by the TB, or the MCS field and the number of RUs occupied by the TB, at least one of the following: the TBS, the Nrep, or the RV.

Manner 2:

The UE determines that the field for determining the coding modulation parameter includes the resource allocation field and the TBS indication field;

the UE determines a number of RUs occupied by the TB according to the resource allocation field; and the UE determines, according to the TBS indication field, or the number of RUs occupied by the TB, or the TBS indication field and the number of RUs occupied by the TB, at least one of the following: the MCS, the Nrep, or the RV.

Manner 3:

The UE determines that the field for determining the coding modulation parameter includes the resource allocation field and the joint coding field of the MCS and the predefined transmission information.

Herein, the joint coding field of the MCS and the predefined transmission information at least includes the following characteristics:

1) the predefined transmission information includes the RV; RVs corresponding to N1 MCSs are always equal to 0; RVs corresponding to N2 MCSs have at least two values; and a number of all the MCSs in the MCS field is (N1+N2); or, 2) the predefined transmission information includes the Nrep; the smaller the MCS index, the larger the Nrep corresponding to the MCS index; the larger the MCS index, the smaller the Nrep corresponding to the MCS index; or 3) the predefined transmission information includes the RV and the Nrep; the smaller the MCS index, the larger the Nrep corresponding to the MCS index and the smaller the number of RVs corresponding to the MCS index; the larger the MCS index, the smaller the Nrep corresponding to the MCS index and the larger the number of RVs corresponding to the MCS index;

the UE determines a number of RUs occupied by the TB according to the resource allocation field; and the UE determines, according to the joint coding field of the MCS and the predefined transmission information, or the number of RUs occupied by the TB, or the joint coding field of the MCS and the predefined transmission information and the number of RUs occupied by the TB, at least one of the following: the TBS, the Nrep, or the RV.

Manner 4:

The UE determines that the field for determining the coding modulation parameter includes the resource allocation field and the joint coding field of the TBS information and the predefined transmission information.

Herein, the joint coding field of the TBS information and the predefined transmission information at least includes the following characteristics:

1) the predefined transmission information includes the RV, RVs corresponding to N1 TBSs in the TBS indication field are always equal to 0; RVs corresponding to N2 TBSs in the TBS indication field at least have two values; and a number of all the TBSs in the TBS indication field is (N1+N2); or, 2) the predefined transmission information includes the Nrep; the smaller the TBS, the larger the Nrep corresponding to the TBS; the larger the TBS, the smaller the Nrep corresponding to the TBS; or 3) the predefined transmission information includes the RV and the Nrep; the smaller the TBS, the larger the Nrep corresponding to the TBS and the smaller the number of RVs corresponding to the TBS; the larger the TBS, the smaller the Nrep corresponding to the TBS and the larger the number of RVs corresponding to the TBS;

the UE determines a number of RUs occupied by the TB according to the resource allocation field; and the UE determines, according to the joint coding field of the TBS indication field and the predefined transmission information, or the number of RUs occupied by the TB, or the joint coding field of the TBS indication field and the predefined transmission information and the number of RUs occupied by the TB, at least one of the following: the TBS, the Nrep, or the RV.

Here, the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

Here, the number of RUs occupied by the TB (Nru) is a number of RUs occupied by the TB during a Hybrid Automatic Repeat request (HARQ) transmission, or the number of RUs occupied by the TB is a number of RUs occupied by the TB before repetition processing of an HARQ transmission.

Herein, an illustration is given below by taking the manner 1 for example, and the implementations of other manners are similar. Those skilled in the art may obtain the implementations of other manners according to the implementation of the manner 1 by analogy, and the implementations fall within the protection scope of the disclosure.

Herein, the manner 1 may include that:

the UE determines the number of RUs occupied by the TB according to the resource allocation field; and the UE determines a TBS index and at least one of the Nrep or the RV, according to the MCS field; and the UE determines the TBS according to the TBS index and the number of RUs occupied by the TB.

Herein, the operation that the UE determines the number of RUs occupied by the TB according to the resource allocation field may include that:

the UE determines that the number of resource elements occupied by the TB, and/or the number of time-domain symbols or the number of time-domain OFDM symbols according to at least one of the following: search space, DCI format, Cyclic Redundancy Check (CRC) scrambling mode corresponding to the DCI, coverage mode, information about the Nrep in high-level configuration signaling, information about the Nrep in a broadcast message, or multiple access mode; and the UE determines the number of RUs according to the number of resource elements and/or the number of time-domain symbols or the number of time-domain OFDM symbols.

Herein, the number of RUs is one of the following:

the product of a prime number less than 10 and a power of 2, the power of 2, and a natural number from 1 to Nmax, where the Nmax is an integer greater than or equal to 1.

Herein, the operation that the UE determines, according to the MCS field, or the number of RUs occupied by the TB, or the MCS field and the number of RUs occupied by the TB, at least one of the following: the TBS, the Nrep, or the RV, may include that:

the UE determines, according to the MCS field, the TBS index and at least one of the Nrep or the RV; and the UE determines the TBS according to the TBS index and the number of RUs occupied by the TB.

Or, the UE determines joint coding information of the TBS index and the predefined transmission information according to the MCS field, and determines, according to the joint coding information of the TBS index and the predefined transmission information, at least one of the following: the TBS index, the Nrep, or the RV; and the UE determines the TBS according to the TBS index and the number of RUs occupied by the TB.

Herein, the UE determines the TBS index and at least one of the Nrep or the RV according to the MCS field may include that:

the UE searches for at least one of an Nrep or an RV corresponding to the MCS field in a first preset mapping relationship among an MCS index, a TBS index and at least one of the Nrep or the RV.

Herein, the first preset mapping relationship is a second modulation and TBS index table including a number L1 of combinations of modulation schemes and TBS indexes which are in a first modulation and TBS index table. The first corresponding relationship is a table search function, indicating a mapping relationship between table indexes and table contents.

Herein, L1 is an integer which is less than or equal to 11, or less than or equal to 8.

Herein, the first modulation and TBS index table is a 5-bit modulation and TBS index table in Release 8 of the LTE system.

Herein, all of the RVs in the number L1 of the combinations of modulation scheme and TBS index are 0, and all of the RVs in the number L2 of the combinations of modulation scheme and TBS index are not 0.

Herein, before searching in the first preset mapping relationship, the UE determines the second modulation and TBS index table according to at least one of the following: link directions, multiple access modes, size of subcarrier interval, application scenarios, protocol versions, a number of transmissions, or carrier frequency.

Here, the application scenarios include Enhanced Mobile Broadband (eMBB) of the fifth generation mobile communication system (5G), Ultra Reliable and Low Latency Communication (URLLC) of 5G, and Massive Machine Type Communication (mMTC).

Herein, the link directions include uplink and downlink; the multiple access modes include a single-tone multiple access mode or a multi-tone multiple access mode.

Herein, the joint coding information of the TBS index and the predefined transmission information is using an index to indicate the TBS index and the predefined transmission information.

When the predefined transmission information in the joint coding field of the TBS index and the predefined transmission information is the RV, RVs corresponding to a number N1 of TBS indexes are 0, and RVs corresponding to a number N2 of TBS indexes have the same value or different values.

When the predefined transmission information in the joint coding information of the TBS index and the predefined transmission information is the Nrep, the smaller the TBS index, the larger the Nrep corresponding to the TBS index; the larger the TBS index, the smaller the Nrep corresponding to the TBS index.

When the predefined transmission information in the joint coding information of the TBS index and the predefined transmission information comprises the RV and the Nrep, the smaller the TBS index, the larger the Nrep corresponding to the TBS index, and the smaller the number of RVs corresponding to the TBS index; the larger the TBS index, the smaller the Nrep corresponding to the TBS index, and the larger the number of RVs corresponding the TBS index.

Herein, when the UE determines that the TBS index is less than or equal to a preset value, there is one RV supported by the UE; when the UE determines that the TBS index is greater than the preset value, there are two or more than two RVs supported by the UE.

Herein, the operation that the UE determines the TBS according to the TBS index and the number of RUs occupied by the TB may include that:

the UE searches for a TBS corresponding to the TBS index and the number of RUs in a second preset mapping relationship among the TBS index, the number of RUs and the TBS.

The embodiments of the disclosure also provides a computer readable storage medium, in which computer executable instructions are stored; the computer executable instructions are used for performing a method for determining a coding modulation parameter according to any one of embodiments above.

The method of the disclosure is elaborated below through specific embodiments.

First Embodiment

The UE receives the DCI sent by the base station, and determines, according to the resource allocation field and the MCS field $I_{MCS}$ in the DCI, at least one of the following: a TBS, an Nrep, or an RV.

Herein, the DCI includes the MCS field $I_{MCS}$ and the resource allocation field.

Herein, the resource allocation field is used for providing information about Resource Unit (RU)-based resource allocation for a Transmission Block (TB); the MCS field is used for indicating the MCS.

Herein, an RU comprises two-dimensional time-frequency resources comprising Nsc consecutive frequency-domain subcarriers and Nsym consecutive time-domain Orthogonal Frequency Division Multiplexing (OFDM) symbols; the RU comprises Nsc×Nsym resource elements, where the Nsc and the Nsym are integers greater than or equal to 1.

Herein, the operation that the UE determines, according to the resource allocation field and the MCS field $I_{MCS}$ in the DCI, at least one of the TBS, the Nrep or the RV may include that:

the UE determines the number of RUs (Nru) occupied by a TB according to the resource allocation field; and the UE determines, according to the MCS field $I_{MCS}$, or the number of RUs Nru occupied by the TB, or the MCS field $I_{MCS}$ and the number of RUs (Nru) occupied by the TB, at least one of the following: the TBS, the Nrep, or the RV.

Herein, the Nru is the number of RUs occupied by one TB during an HARQ transmission, or the number of RUs occupied by one TB before repetition processing of an HARQ transmission.

Herein, the operation that the UE determines, according to the MCS field $I_{MCS}$, or the number of RUs occupied by the TB, or the MCS field $I_{MCS}$ and the number of RUs occupied by the TB, at least one of the TBS, the Nrep or the RV may include that:

the UE determines, according to the MCS field $I_{MCS}$, at least one of the following: the TBS, the Nrep, or the RV, and determines the TBS according to the TBS index and the Nru;

or, the UE determines, according to the MCS field $I_{MCS}$, the joint coding information of the TBS index and the predefined transmission information, and determines at least one of the TBS index, the Nrep, or the RV according to the joint coding information of the TBS index and the predefined transmission information.

Herein, the joint coding information of the TBS index and the predefined transmission information includes at least one of the following characteristics:

when the predefined transmission information in the joint coding information of the TBS index and the predefined transmission information is the RV, RVs corresponding to N1 TBS indexes are 0, and RVs corresponding to N2 TBS indexes have the same value or different values;

when the predefined transmission information in the joint coding information of the TBS index and the predefined transmission information is the Nrep, the smaller the TBS index, the larger the Nrep corresponding to the TBS index; the larger the TBS index, the smaller the Nrep corresponding to the TBS index; or when the predefined transmission information in the joint coding information of the TBS index and the predefined transmission information comprises the RV and the Nrep, the smaller the TBS index, the larger the Nrep corresponding to the TBS index, and the smaller the number of RVs corresponding to the TBS index; the larger the TBS index, the smaller the Nrep corresponding to the TBS index, and the larger the number of RVs corresponding the TBS index.

Herein, the MCS field only indicates one TBS index and one RV; or, when the TBS index indicated by the MCS field is less than or equal to the preset value, one TBS index corresponds to only one RV; when the TBS index indicated by the MCS field is greater than the preset value, one TBS index corresponds to at least two RVs.

Particularly, when the TBS index is less than or equal to 3, because a coding rate is lower than or equal to 1/3 coding rate, it is only needed to support version 0; when the TBS index is greater than 3, because the coding rate is higher than 1/3 coding rate, it is needed to support at least two versions.

In an example below, the RV to be supported is extended without increasing $I_{MCS}$ overheads.

TABLE 1

The second modulation and TBS index table

| MCS index $I_{MCS}$ | Modulation order $Q_m$ | TBS index $I_{TBS}$ | RV |
|---|---|---|---|
| 0(0) | 2 | 0 | 0 |
| 1(1) | 2 | 1 | 0 |
| 2(2) | 2 | 2 | 0 |
| 3(3) | 2 | 3 | 0 |
| 4(4) | 2 | 4 | 0 |
| 5(5) | 2 | 5 | 0 |
| 6(6) | 2 | 6 | 0 |
| 7(7) | 2 | 7 | 0 |
| 8(8) | 2 | 8 | 0 |
| 9(9) | 2 | 9 | 0 |
| 10(4) | 2 | 4 | 2 |
| 11(5) | 2 | 5 | 2 |
| 12(6) | 2 | 6 | 2 |
| 13(7) | 2 | 7 | 2 |
| 14(8) | 2 | 8 | 2 |
| 15(9) | 2 | 9 | 2 |

Herein, based on the second modulation and the TBS index table, the UE determines the TBS index according to the MCS field; the first modulation and the TBS index table is the 5-bit modulation and the TBS index table in Release-8 of the LTE system.

The second modulation and the TBS index table has the following characteristic: the MCS index in the second modulation and the TBS index table has 16 values, that is, the MCS index is indicated by 4 bits. The number L1 of combinations of modulation modes and TBS indexes, except a number L2 of combinations of modulation mode and TBS index, in the first modulation and TBS index table serve as the number L1 of combinations of modulation mode and TBS index in the second modulation and the TBS index table in order, and RVs corresponding to these combinations are 0. RVs corresponding to the number L2 of the combinations except the number L1 of the combinations in the second modulation and the TBS index table are not 0; here, the L1 is equal to 10, and the L2 is equal to 6.

Compared with the related technology, the second modulation and TBS index table may support 10 MCS orders, 4 bits are needed to indicate the MCS field in the DCI, and 1 bit or 2 bits are needed to indicate the RV. In the disclosure, the table essentially may support 10 MCS orders, 4 bits are needed to indicate the MCS field in the DCI, and an independent signaling for indicating the RV is not needed. In the disclosure, the 6 default states are used to bear information of different RVs, so there are 6 MCS orders which may support the RV0 or the RV2; the rates of these six MCS orders are usually higher than 1/3 coding rate, and a decoder may obtain a gain of combined Incremental Redundancies (IR) during repeated transmission or HARQ transmission. The rates of the rest 4 MCSs are usually lower than 1/3 coding rate, the support of multiple RVs cannot improve the performance notably. So, according to the technical solutions of the disclosure, the signaling overhead of 1 bit to 2 bits for indicating the RV can be saved, this is crucial for an NB-IOT UE. Further, according to the disclosure, a MCS can support at least two RVs, thereby dramatically improving the performance of repeated transmission and HARQ transmission.

The UE determines the TBS according to the TBS index and the number of RUs (Nru) occupied by one TB. Particularly, the UE may determine the TBS based on a table below.

TABLE 2

A mapping relationship among the TBS index, the number of RUs and the TBS

| | $N_{ru}$ | | | | | | |
|---|---|---|---|---|---|---|---|
| | 1 | 2 | 3 | 4 | 5 | 6 | 7 |
| 0 | 16 | 32 | 56 | 88 | 120 | 152 | 176 |
| 1 | 24 | 56 | 88 | 144 | 176 | 208 | 224 |
| 2 | 32 | 72 | 144 | 176 | 208 | 256 | 296 |
| 3 | 40 | 104 | 176 | 208 | 256 | 328 | 392 |
| 4 | 56 | 120 | 208 | 256 | 328 | 408 | 488 |
| 5 | 72 | 144 | 224 | 328 | 424 | 504 | 600 |
| 6 | 328 | 176 | 256 | 392 | 504 | 600 | 712 |
| 7 | 104 | 224 | 328 | 472 | 584 | 712 | 840 |
| 8 | 120 | 256 | 392 | 536 | 680 | 808 | 968 |
| 9 | 136 | 296 | 456 | 616 | 776 | 936 | |

Second Embodiment

The UE receives the DCI sent by the base station, and determines, according to the TBS indication field and the resource allocation field, at least one of the following: the MCS, the Nrep, or the RV.

Herein, the operation that the UE determines at least one of the MCS, the Nrep, or the RV according to the TBS indication field and the resource allocation field includes that:

the UE determines the number of RUs occupied by one TB according to the resource allocation field; and the UE determines, according to the TBS indication field and the Nru, at least one of the following: the MCS, the Nrep, or the RV.

Herein, the Nru is the number of RUs occupied by one TB during an HARQ transmission, or the number of RUs occupied by one TB before repetition processing of an HARQ transmission.

Herein, the operation that the UE determines at least one of the MCS, the Nrep or the RV according to the TBS indication field and the Nru includes that:

the UE searches for the TBS of the current TB in a one-dimensional table according to the TBS index; and the UE searches for at least one of the MCS, the Nrep, or the RV in a two-dimensional table according to the number of RUs occupied by one TB and the TBS index.

The advantages of the embodiment are that: when the number of TBS supported is very limited, for example, the number of TBS supported is less than or equal to 8, the TBS index may directly indicate the TBS, and the MCS may be determined according to the TBS index and the Nru, so the minimum signaling overhead may be ensured.

Third Embodiment

The UE receives the DCI sent by the base station, and determines, according to the joint coding field of the MCS and the predefined transmission information in the DCI and the number of RUs occupied by one TB, at least one of the following: the TBS, the Nrep, or the RV.

Herein, the operation that the UE determines at least one of the TBS, the Nrep, or the RV according to the joint coding field of the MCS and the predefined transmission information in the DCI and the number of RUs occupied by one TB includes that:

the UE determines the number of RUs occupied by one TB according to the resource allocation field; and the UE determines, according to the joint coding field of the MCS and the predefined transmission information in the DCI and the number of RUs occupied by one TB, at least one of the following: the MCS, the Nrep, or the RV.

Herein, the number of RUs occupied by one TB is the number of RUs occupied by one TB during an HARQ transmission, or the number of RUs occupied by one TB before repetition processing of an HARQ transmission.

The operation that the UE determines at least one of the MCS, the Nrep or the RV according to the joint coding field of the MCS and the predefined transmission information and the number of RUs occupied by one TB includes that:

the UE searches for at least one of the MCS, the Nrep, or the RV in a one-dimensional table according to the joint coding field of the MCS and the predefined transmission information; and the UE searches for the TBS in the two-dimensional table according to the number of RUs occupied by one TB and the joint coding field of the MCS and the predefined transmission information.

Fourth Embodiment

The UE receives the DCI sent by the base station, and determines, according to the joint coding field of the TBS information and the predefined transmission information and the resource allocation field, at least one of the following: the MCS, the Nrep, or the RV.

Herein, the operation that the UE determines at least one of the MCS, the Nrep, or the RV according to the joint coding field of the TBS information and the predefined transmission information and the resource allocation field includes that:

the UE determines the number of RUs occupied by one TB according to the resource allocation field; and the UE determines, according to the joint coding field of the TBS information and the predefined transmission information and the number of RUs occupied by one TB, at least one of the following: the MCS, the Nrep, or the RV.

Herein, the number of RUs occupied by one TB is the number of RUs occupied by one TB during an HARQ transmission, or the number of RUs occupied by one TB before repetition processing of an HARQ transmission.

Herein, the operation that the UE determines at least one of the MCS, the Nrep or the RV according to the joint coding field of the TBS information and the predefined transmission information and the number of RUs occupied by one TB includes that:

the UE searches for at least one of the TBS, the Nrep, or the RV in the one-dimensional table according to the joint coding field of the TBS information and the predefined transmission information; and the UE searches for MCS in the two-dimensional table according to the number of RUs occupied by one TB and the joint coding field.

Fifth Embodiment

The UE receives the DCI sent by the base station, and determines the coding modulation parameter according to the field for determining the coding modulation parameter in the DCI.

Herein, the RU includes one of the following characteristics:

1) the number of resource elements included in one RU ($Nre0 = Nsc \times Nsym0$) and/or the number of time-domain symbols occupied by one RU ($Nsym0$) are/is the same in both modes for the UE, such as, the single-tone multiple access mode and the multi-tone multiple access mode, and at least one of the $Nre0$ or $Nsym0$ is a fixed value or determined according to the semi-static high-level configuration parameter;

2) the $Nre0 = Nsc \times Nsym0$ and the $Nsym0$ are different in both modes for the UE, such as, the single-tone multiple access mode and the multi-tone multiple access mode.

Further, the RU includes one of the following characteristics:

the $Nre0$ or the $Nsym0$ in each multiple address mode is a fixed value or determined according to the semi-static high-level configuration parameter;

the $Nre0$ or the $Nsym0$ corresponding to the single-tone multiple address mode is read from the first set, and the value of the $Nre0$ or the $Nsym0$ corresponding to the multiple-tone multiple address mode is read from the second set; here, the first set is a subset of the second set;

the $Nre0$ or the $Nsym0$ corresponding to the single-tone multiple address mode is an integral multiple of the $Nre0$ or the $Nsym0$ corresponding to the multiple-tone multiple address mode;

the $Nre0$ or the $Nsym0$ corresponding to the multi-tone multiple address mode is an integral multiple of the $Nre0$ or the $Nsym0$ corresponding to the single-tone multiple address mode;

the $Nre0$ or the $Nsym0$ in each of the single-tone multiple address mode and the multi-tone multiple address mode is a common divisor of X, where the X is a positive integer greater than 10.

Further, the $Nre0$, or the $Nsym0$, or the $Nre0$ and the $Nsym0$, in both modes for the UE, such as, the single-tone multiple access mode and the multi-tone multiple access mode, is the same.

The RU includes one of the following characteristics:

1) Each RU is a time-frequency resource block including $Nsc$ frequency-domain subcarriers and $Nsym0$ time-domain symbols; where the $Nsym0$ is the number of time-domain symbols, which is a fixed value or determined according to the semi-static high-level configuration parameter; the $Nsc$ is an integer greater than or equal to 1.

2) Each RU is a time-frequency resource block including $Nsc$ frequency-domain subcarriers and $Nre0/Nsc$ time-domain symbols; where the $Nre0$ is the number of resource elements, which is a fixed value or determined according to the semi-static high-level configuration parameter.

In the above embodiments, there is such a situation: the UE is required to determine the coding modulation parameter according to the number of RUs (Nru) occupied by one TB.

The UE determines the Nru according to the resource allocation field.

Situation 1

The UE determines, according to the resource allocation field, the number of frequency-domain subcarriers (Nsc) occupied by one TB and the number of time-domain OFDM symbols (Nsym) occupied by one TB, and determines the number of RUs (Nru) occupied by one TB according to the Nsc and the Nsym.

Further, the Nsym has one of the following characteristics:

the fixed value of the Nsym in the single-tone multiple address mode and the multi-tone multiple address mode is the same;

the fixed value of the Nsym in the single-tone multiple address mode is different from that in the multi-tone multiple address mode;

the fixed value of the Nsym in the single-tone multiple address mode or the multi-tone multiple address mode is different varies with a coverage level;

the Nsym in the single-tone multiple access mode is read from a first set, and the Nsym in the multi-tone multiple access mode is read from a second set; where the first set is a subset of the second set; and the Nsym in the low coverage level is read from a first set, and the Nsym in the high coverage level is read from a second set; where the first set is a subset of the second set.

Further, the Nsc is the power of 2 or the product of the prime number less than 10 and the power of 2; the Nsym includes: the product of the prime number less than 10 and the power of 2, or the power of 2.

Specifically, the possible values of the Nsc is a subset of the set {1, 2, 3, 4, 6, 8, 12}. The possible values of the Nsc is a subset of the set {1, 2, 3, 4, 6, 12}. The Nsym is equal to K1×144 for both the single-tone multiple address mode and the multi-tone multiple address mode, where the K1 is an integer greater than or equal to 1. Or, the possible values of the Nsc form a subset of the set {1, 2, 3, 4, 6, 8, 12}, and the subset must include 8. The Nsym is equal to K2×144 for the single-tone multiple address mode, and the Nsym is equal to K3×288 for the multi-tone multiple address mode, where the K2 and the K3 are integers greater than or equal to 1. Here, the K1 is equal to 1, the K2 is equal to 1, and the K3 is equal to 1; or, the K1 is equal to 5, the K2 is equal to 5, and the K3 is equal to 5; or, the K1 is equal to 10, the K2 is equal to 10, and the K3 is equal to 10.

Further, the Nsc is the power of 2 or the product of the prime number less than 10 and the power of 2; each of the Nsym and the Nrep includes one of the following: the power of 2 or the product of the prime number less than 10 and the power of 2, and only the power of 2.

Further, all of the values of the Nru satisfy one of the following: the power of 2 or the product of the prime number less than 10 and the power of 2, only the power of 2, and the natural number from 1 to Nmax, where the Nmax is an integer greater than or equal to 1.

Situation 2

That the UE determines the number of RUs (Nru) occupied by one TB according to the resource allocation field includes that:

the UE determines, according to the resource allocation field, the number of frequency-domain subcarriers Nsc occupied by one TB, the number of time-domain OFDM symbols (Nsym) occupied by one TB, and the Nrep; and the UE determines the number of RUs (Nru) occupied by one TB according to the number of frequency-domain subcarriers Nsc occupied by one TB, the number of time-domain OFDM symbols (Nsym) occupied by one TB, and the Nrep.

Herein, each RU includes Nsc consecutive frequency-domain subcarriers and Nsym0 consecutive time-domain OFDM symbols; each RU includes Nsc×Nsym0 resource elements. Here, the Nsym0 is a preset fixed value.

Further, that the UE determines the number of OFDM symbols (Nsym) occupied by one TB or at least one of the Nre0 or the Nsym0 according to at least one of the following:

search space, DCI format, CRC scrambling mode corresponding to the DCI, coverage mode, information about Nrep in a high-level configuration signaling, information about Nrep in a broadcast message, and multiple access mode.

Figure 2:
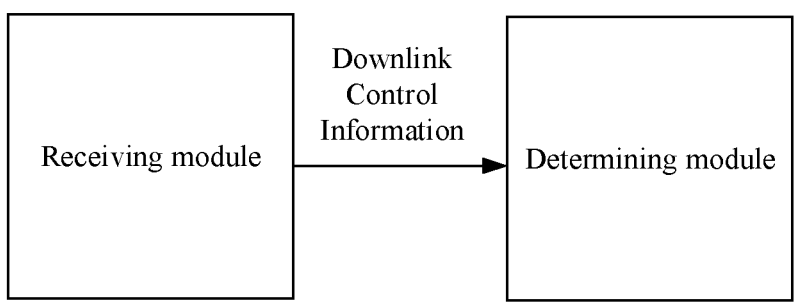
FIG. 2 is a structure diagram of a UE according to the disclosure.

As illustrated in FIG. 2, the disclosure also provides a User Equipment (UE), which includes that:

a receiving module, configured to receive Downlink Control Information (DCI) from a base station; and a determining module, configured to determine a coding modulation parameter according to a field for determining the coding modulation parameter, in the DCI.

Herein, the determining module may be further configured to determine the coding modulation parameter using one of the following manners.

Manner 1:

determining that the field for determining the coding modulation parameter comprises a resource allocation field and a Modulation and Coding Scheme (MCS) field;

determining a number of Resource Units (RUs) occupied by a Transmission Block (TB) according to the resource allocation field; and determining, by the UE, according to the MCS field, or the number of RUs occupied by the TB, or the MCS field and the number of RUs occupied by the TB, at least one of the following: Transmission Block Size (TBS), a number of repetitions (Nrep), or a Redundancy Version (RV).

Manner 2:

determining that the field for determining the coding modulation parameter comprises a resource allocation field and a TBS indication field;

determining a number of RUs occupied by a TB according to the resource allocation field; and determining, according to the TBS indication field, or the number of RUs occupied by the TB, or the TBS indication field and the number of RUs occupied by the TB, at least one of the following: an MCS, an Nrep, or an RV.

Manner 3:

determining that the field for determining the coding modulation parameter comprises a resource allocation field and a joint coding field of an MCS and predefined transmission information;

wherein the joint coding field of the MCS and the predefined transmission information at least comprises that:

the predefined transmission information comprises an RV; RVs corresponding to N1 MCSs are always equal to 0; RVs corresponding to N2 MCSs have at least two values; and a number of all the MCSs in an MCS field is (N1+N2); or, the predefined transmission information comprises an Nrep; the smaller the MCS index, the larger the Nrep corresponding to the MCS index; the larger the MCS index, the smaller the Nrep corresponding to the MCS index; or the predefined transmission information comprises the RV and the Nrep; the smaller the MCS index, the larger the Nrep corresponding to the MCS index and the smaller a number of RVs corresponding to the MCS index; the larger the MCS index, the smaller the Nrep corresponding to the MCS index and the larger the number of RVs corresponding to the MCS index;

determining a number of RUs occupied by a TB according to the resource allocation field; and determining, according to the joint coding field of the MCS and the predefined transmission information, or the number of RUs occupied by the TB, or the joint coding field of the MCS and the predefined transmission information and the number of RUs occupied by the TB, at least one of the following: a TBS, the Nrep, or the RV.

Manner 4:

determining that the field for determining the coding modulation parameter comprises a resource allocation field and a joint coding field of TBS information and predefined transmission information;

wherein the joint coding field of the TBS information and the predefined transmission information at least comprises that:

the predefined transmission information comprises an RV, RVs corresponding to N1 TBSs in the TBS indication field are always equal to 0; RVs corresponding to N2 TBSs in the TBS indication field at least have two values; and a number of all the TBSs in the TBS indication field is (N1+N2); or, the predefined transmission information comprises an Nrep; the smaller the TBS, the larger the Nrep corresponding to the TBS; the larger the TBS, the smaller the Nrep corresponding to the TBS; or the predefined transmission information comprises an RV and an Nrep; the smaller the TBS, the larger the Nrep corresponding to the TBS and the smaller the number of RVs corresponding to the TBS; the larger the TBS, the smaller the Nrep corresponding to the TBS and the larger the number of RVs corresponding to the TBS;

determining a number of RUs occupied by a TB according to the resource allocation field; and determining, according to the joint coding field of the TBS indication field and the predefined transmission information, or the number of RUs occupied by the TB, or the joint coding field of the TBS indication field and the predefined transmission information and the number of RUs occupied by the TB, at least one of the following: the TBS, the Nrep, or the RV;

wherein the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

Herein, the determining module may be further configured to:

determine a number of RUs occupied by a TB according to a resource allocation field;

determine an TBS index and at least one of an Nrep or an RV according to an MCS field; and determine a TBS according to the TBS index and the number of RUs occupied by the TB.

Herein, the determining module is further configured to:

determine a number of RUs occupied by a TB according to a resource allocation field;

search for a TBS index and at least one of an Nrep or an RV corresponding to an MCS field in a first preset mapping relationship among an MCS index, a TBS index and at least one of the Nrep or the RV; and determine a TBS according to the TBS index and the number of RUs occupied by the TB.

Herein, the determining module may be further configured to:

determine a number of RUs occupied by a TB according to a resource allocation field;

determine at least one of the following according to an MCS field: a TBS index, an Nrep, or an RV; and search for a TBS corresponding to the TBS index and the number of RUs in a second preset mapping relationship among the TBS index, the number of RUs and the TBS.

Herein, the determining module is further configured to:

determine a number of RUs occupied by a TB according to a resource allocation field;

determine a joint coding information of a TBS index and predefined transmission information according to an MCS field; determine according to the joint coding information of the TBS index and the predefined transmission information at least one of the following: the TBS index, an Nrep, or an RV; and determine a TBS according to the TBS index and the number of RUs occupied by the TB.

Herein, the determining module is further configured to:

determine a number of resource elements occupied by a TB or a number of time-domain symbols or a number of time-domain OFDM symbols according to at least one of the following: search space, DCI format, Cyclic Redundancy Check (CRC) scrambling mode corresponding to the DCI, coverage mode, information about the Nrep in high-level configuration signaling, information about the Nrep in a broadcast message, or multiple access mode; and determine the number of RUs according to the number of resource elements or the number of time-domain symbols or the number of time-domain OFDM symbols.

The disclosure also provides a base station, which includes that:

a sending module, configured to send Downlink Control Information (DCI) to a User Equipment (UE), where the DCI comprises a field for determining a coding modulation parameter.

Figure 3:
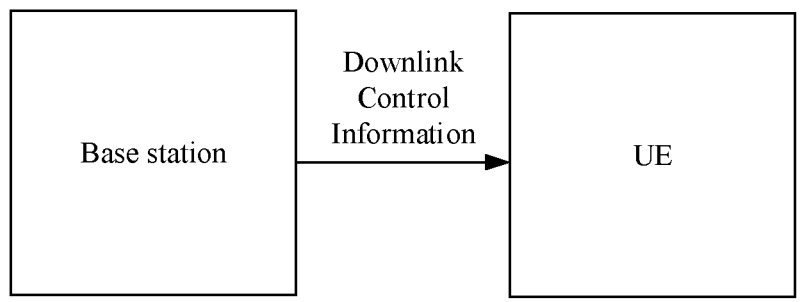
FIG. 3 is a structure diagram of a system for determining a coding modulation parameter according to the disclosure.

As illustrated in FIG. 3, the disclosure also provides a system for determining a coding modulation parameter, which includes:

a base station according to any one of the embodiments above, and a User Equipment (UE) according to any one of the embodiments above.

Apparently, those skilled in the art should appreciate that the above modules and steps of the disclosure can be implemented by a general-purpose computing device, and they can be centralized in a single computing device or distributed on a network composed of multiple computing devices; alternatively, they can be implemented by a program code which is capable of being executed by the computing device, so that they can be stored in a storage device and executed by the computing device; and in some situations, the presented or described steps can be executed in an order different from that described here; or they are made into integrated circuit modules, respectively; or multiple modules and steps of them are made into a single integrated circuit module to realize. In this way, the disclosure is not limited to any particular combination of hardware and software.

The above is only the preferred embodiment of the disclosure and not intended to limit the disclosure; for those skilled in the art, the disclosure may have various modifications and changes. Any modifications, equivalent replacements, improvements and the like within the principle of the disclosure shall fall within the scope of the claims of the disclosure.

INDUSTRIAL APPLICABILITY

The disclosure provides a method, device and system for determining a coding modulation parameter. The method includes that: the UE receives the DCI from the base station, and determines the coding modulation parameter according to the field for determining the coding modulation parameter in the DCI. Through the technical solutions of the present disclosure, the coding modulation parameter is determined according to the field for determining the coding modulation parameter in the DCI, so that the determination of the coding modulation parameter of the NB-IOT system is implemented.

The invention claimed is:

1. A method for determining a coding modulation parameter, comprising:
   receiving, by a User Equipment (UE), Downlink Control Information (DCI) from a base station; and
   determining, by the UE, a coding modulation parameter, according to a field for determining the coding modulation parameter, in the DCI;
   wherein the coding modulation parameter comprises at least one of the following: Transmission Block Size (TBS), a Modulation and Coding Scheme (MCS), or predefined transmission information;
   wherein the field for determining the coding modulation parameter comprises: a resource allocation field and one of an MCS field, or a joint coding field of the MCS and the predefined transmission information;
   wherein the resource allocation field is used for providing information about Resource Unit (RU)-based resource allocation for a Transmission Block (TB); the MCS field is used for indicating the MCS; and
   wherein an RU comprises two-dimensional time-frequency resources comprising Nsc consecutive frequency-domain subcarriers and Nsym consecutive time-domain Orthogonal Frequency Division Multiplexing (OFDM) symbols; the RU comprises Nsc× Nsym resource elements, where the Nsc and the Nsym are integers greater than or equal to 1;
   wherein the predefined transmission information comprises at least one of the following: a number of repetitions (Nrep) or a Redundancy Version (RV), wherein the RV is an element in a set {0, 1} or a set {0, 1, 2, 3};
   wherein determining the coding modulation parameter according to the field for determining the coding modulation parameter, in the DCI comprises one of the following:
   Manner 1:
   determining, by the UE, that the field for determining the coding modulation parameter comprises the resource allocation field and the MCS field;
   determining, by the UE, according to the resource allocation field, a number of RUs occupied by the TB; and
   determining the Nrep by the UE according to the MCS field, or the number of RUs occupied by the TB, or the MCS field and the number of RUs occupied by the TB;
   Manner 2:
   determining, by the UE, that the field for determining the coding modulation parameter comprises the resource allocation field and the joint coding field of the MCS and the predefined transmission information;
   wherein the joint coding field of the MCS and the predefined transmission information at least comprises that:
   the predefined transmission information comprises the RV; RVs corresponding to N1 MCSs are always equal to 0; RVs corresponding to N2 MCSs have at least two values; and a number of all the MCSs in the MCS field is (N1+N2); or,
   the predefined transmission information comprises the Nrep; the smaller the MCS index, the larger the Nrep corresponding to the MCS index; the larger the MCS index, the smaller the Nrep corresponding to the MCS index; or
   the predefined transmission information comprises the RV and the Nrep; the smaller the MCS index, the larger the Nrep corresponding to the MCS index and the smaller the number of RVs corresponding to the MCS index; the larger the MCS index, the smaller the Nrep corresponding to the MCS index and the larger the number of RVs corresponding to the MCS index;
   determining, by the UE, according to the resource allocation field, a number of RUs occupied by the TB; and
   determining, by the UE, according to the joint coding field of the MCS and the predefined transmission information, or the number of RUs occupied by the TB, or the joint coding field of the MCS and the predefined transmission information and the number of RUs occupied by the TB, at least one of the following: the TBS, the Nrep, or the RV;
   wherein the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

2. The method according to claim 1, wherein the RU comprises one of the following characteristics:
   for the UE, the numbers of resource elements comprised in one RU, the numbers of time-domain symbols occupied by one RU, or the numbers of resource elements comprised in one RU and the numbers of time-domain symbols occupied by the one RU are the same in both of a single-tone multiple access mode and a multi-tone multiple access mode, and at least one of the number of resource elements or the number of time-domain symbols is a fixed value or determined according to a semi-static high-level configuration parameter; or
   for the UE, the numbers of resource elements comprised in the RU and the numbers of time-domain symbols occupied by the RU are different in both of the single-tone multiple access mode and the multi-tone multiple access mode; and wherein
   the number of resource elements and the number of time-domain symbols in each of the single-tone multiple access mode and the multi-tone multiple access mode are fixed values or determined according to the semi-static high-level configuration parameter;
   or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;
   or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;

or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;

or the number of resource elements or the number of time-domain symbols in each of the single-tone multiple access mode and the multi-tone multiple access mode is a common divisor of X, where the X is a positive integer greater than a preset threshold.

3. The method according to claim 2, wherein the RU is a time-frequency resource block comprising Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;

or the RU is a time-frequency resource block comprising Nsc frequency-domain subcarriers and Nre0/Nsc time-domain symbols; where the Nre0 is the number of resource elements, which is a fixed value or determined according to the semi-static high-level configuration parameter.

4. The method according to claim 3, wherein the Nsc is an element in a subset of a set {1, 2, 3, 4, 6, 8, 12}.

5. The method according to claim 1, wherein the number of RUs comprises the product of a prime number less than 10 and a power of 2.

6. A method for determining a coding modulation parameter, comprising:
sending, by a base station, Downlink Control Information (DCI) to a User Equipment (UE), wherein the DCI comprises a field for determining a coding modulation parameter;
wherein the coding modulation parameter comprises at least one of the following: Transmission Block Size (TBS), a Modulation and Coding Scheme (MCS), or predefined transmission information;
wherein the field for determining the coding modulation parameter comprises: a resource allocation field and one of an MCS field, or a joint coding field of the MCS and the predefined transmission information;
wherein the resource allocation field is used for providing information about Resource Unit (RU)-based resource allocation for a Transmission Block (TB); the MCS field is used for indicating the MCS; and
wherein an RU comprises two-dimensional time-frequency resources comprising Nsc consecutive frequency-domain subcarriers and Nsym consecutive time-domain Orthogonal Frequency Division Multiplexing (OFDM) symbols; the RU comprises Nsc× Nsym resource elements, where the Nsc and the Nsym are integers greater than or equal to 1;
wherein the predefined transmission information comprises at least one of the following: a number of repetitions (Nrep) or a Redundancy Version (RV), wherein the RV is an element in a set {0, 1} or a set {0, 1, 2, 3};
wherein the method further comprises determining, by the UE, the coding modulation parameter according to the field for determining the coding modulation parameter, wherein the determining, by the UE, the coding modulation parameter according to the field for determining the coding modulation parameter comprises one of the following:

Manner 1:
determining, by the UE, that the field for determining the coding modulation parameter comprises the resource allocation field and the MCS field;
determining, by the UE, according to the resource allocation field, a number of RUs occupied by the TB; and
determining the Nrep by the UE according to the MCS field, or the number of RUs occupied by the TB, or the MCS field and the number of RUs occupied by the TB;

Manner 2:
determining, by the UE, that the field for determining the coding modulation parameter comprises the resource allocation field and the joint coding field of the MCS and the predefined transmission information;
wherein the joint coding field of the MCS and the predefined transmission information at least comprises that:
the predefined transmission information comprises the RV; RVs corresponding to N1 MCSs are always equal to 0; RVs corresponding to N2 MCSs have at least two values; and a number of all the MCSs in the MCS field is (N1+N2); or,
the predefined transmission information comprises the Nrep; the smaller the MCS index, the larger the Nrep corresponding to the MCS index; the larger the MCS index, the smaller the Nrep corresponding to the MCS index; or
the predefined transmission information comprises the RV and the Nrep; the smaller the MCS index, the larger the Nrep corresponding to the MCS index and the smaller the number of RVs corresponding to the MCS index; the larger the MCS index, the smaller the Nrep corresponding to the MCS index and the larger the number of RVs corresponding to the MCS index;
determining, by the UE, according to the resource allocation field, a number of RUs occupied by the TB; and
determining, by the UE, according to the joint coding field of the MCS and the predefined transmission information, or the number of RUs occupied by the TB, or the joint coding field of the MCS and the predefined transmission information and the number of RUs occupied by the TB, at least one of the following: the TBS, the Nrep, or the RV;
wherein the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

7. The method according to claim 6, wherein the RU comprises one of the following characteristics:
for the UE, the numbers of resource elements comprised in one RU, the numbers of time-domain symbols occupied by one RU, or the numbers of resource elements comprised in one RU and the numbers of time-domain symbols occupied by the one RU are the same in both of a single-tone multiple access mode and a multi-tone multiple access mode, and at least one of the number of resource elements or the number of time-domain symbols is a fixed value or determined according to a semi-static high-level configuration parameter; or for the UE, the numbers of resource elements comprised in the RU and the numbers of time-domain symbols occupied by the RU are different in both of the single-tone multiple access mode and the multi-tone multiple access mode; and wherein
the number of resource elements and the number of time-domain symbols in each of the single-tone multiple access mode and the multi-tone multiple access mode are fixed values or determined according to the semi-static high-level configuration parameter;
or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;
or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;
or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;
or the number of resource elements or the number of time-domain symbols in each of the single-tone multiple access mode and the multi-tone multiple access mode is a common divisor of X, where the X is a positive integer greater than a preset threshold.

8. The method according to claim 7, wherein the RU is a time-frequency resource block comprising Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;
or the RU is a time-frequency resource block comprising Nsc frequency-domain subcarriers and Nre0/Nsc time-domain symbols; where the Nre0 is the number of resource elements, which is a fixed value or determined according to the semi-static high-level configuration parameter.

9. The method according to claim 8, wherein the Nsc is an element in a subset of a set {1, 2, 3, 4, 6, 8, 12}.

10. The method according to claim 6, wherein the number of RUs comprises the product of a prime number less than 10 and a power of 2.

11. A User Equipment (UE), comprising a processor and a memory storing instructions, wherein when the instructions in the memory are run, the processor is configured to:
receive Downlink Control Information (DCI) from a base station; and
determine a coding modulation parameter according to a field for determining the coding modulation parameter, in the DCI;
wherein the coding modulation parameter comprises at least one of the following: Transmission Block Size (TBS), a Modulation and Coding Scheme (MCS), or predefined transmission information;

wherein the field for determining the coding modulation parameter comprises: a resource allocation field and one of an MCS field, or a joint coding field of the MCS and the predefined transmission information;
wherein the resource allocation field is used for providing information about Resource Unit (RU)-based resource allocation for a Transmission Block (TB); the MCS field is used for indicating the MCS; and
wherein an RU comprises two-dimensional time-frequency resources comprising Nsc consecutive frequency-domain subcarriers and Nsym consecutive time-domain Orthogonal Frequency Division Multiplexing (OFDM) symbols; the RU comprises Nsc× Nsym resource elements, where the Nsc and the Nsym are integers greater than or equal to 1;
wherein the predefined transmission information comprises at least one of the following: a number of repetitions (Nrep) or a Redundancy Version (RV), wherein the RV is an element in a set {0, 1} or a set {0, 1, 2, 3};
the processor is further configured to determine the coding modulation parameter according to the field for determining the coding modulation parameter, in the DCI, in one of the following manners:
Manner 1:
determining that the field for determining the coding modulation parameter comprises the resource allocation field and the MCS field;
determining, according to the resource allocation field, a number of RUs occupied by the TB; and
determining the Nrep according to the MCS field, or the number of RUs occupied by the TB, or the MCS field and the number of RUs occupied by the TB;
Manner 2:
determining that the field for determining the coding modulation parameter comprises the resource allocation field and the joint coding field of the MCS and the predefined transmission information;
wherein the joint coding field of the MCS and the predefined transmission information at least comprises that:
the predefined transmission information comprises the RV; RVs corresponding to N1 MCSs are always equal to 0; RVs corresponding to N2 MCSs have at least two values; and a number of all the MCSs in the MCS field is (N1+N2); or,
the predefined transmission information comprises the Nrep; the smaller the MCS index, the larger the Nrep corresponding to the MCS index; the larger the MCS index, the smaller the Nrep corresponding to the MCS index; or
the predefined transmission information comprises the RV and the Nrep; the smaller the MCS index, the larger the Nrep corresponding to the MCS index and the smaller the number of RVs corresponding to the MCS index; the larger the MCS index, the smaller the Nrep corresponding to the MCS index and the larger the number of RVs corresponding to the MCS index;
determining, according to the resource allocation field, a number of RUs occupied by the TB; and
determining, according to the joint coding field of the MCS and the predefined transmission information, or the number of RUs occupied by the TB, or the joint coding field of the MCS and the predefined transmission information and the number of RUs occupied by the TB, at least one of the following: the TBS, the Nrep, or the RV;
wherein the number of RUs occupied by the TB is a number of RUs occupied by the TB during a Hybrid Automatic Repeat request (HARQ) transmission, or the number of RUs occupied by the TB is a number of RUs occupied by the TB before repetition processing of an HARQ transmission.

12. The UE according to claim 11, wherein the RU comprises one of the following characteristics:
for the UE, the numbers of resource elements comprised in one RU, the numbers of time-domain symbols occupied by one RU, or the numbers of resource elements comprised in one RU and the numbers of time-domain symbols occupied by the one RU are the same in both of a single-tone multiple access mode and a multi-tone multiple access mode, and at least one of the number of resource elements or the number of time-domain symbols is a fixed value or determined according to a semi-static high-level configuration parameter; or
for the UE, the numbers of resource elements comprised in the RU and the numbers of time-domain symbols occupied by the RU are different in both of the single-tone multiple access mode and the multi-tone multiple access mode; and wherein
the number of resource elements and the number of time-domain symbols in each of the single-tone multiple access mode and the multi-tone multiple access mode are fixed values or determined according to the semi-static high-level configuration parameter;
or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;
or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;
or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;
or the number of resource elements or the number of time-domain symbols in each of the single-tone multiple access mode and the multi-tone multiple access mode is a common divisor of X, where the X is a positive integer greater than a preset threshold.

13. The UE according to claim 12, wherein the RU is a time-frequency resource block comprising Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;
or the RU is a time-frequency resource block comprising Nsc frequency-domain subcarriers and Nre0/Nsc time-domain symbols; where the Nre0 is the number of resource elements, which is a fixed value or determined according to the semi-static high-level configuration parameter.

14. The UE according to claim 13, wherein the Nsc is an element in a subset of a set $\{1, 2, 3, 4, 6, 8, 12\}$.

15. The UE according to claim 11, wherein the number of RUs comprises the product of a prime number less than 10 and a power of 2.

16. A non-transitory storage medium, in which instructions are stored; the instructions are used for performing a method for determining a coding modulation parameter according to claim 1.

17. The storage medium according to claim 16, wherein the RU comprises one of the following characteristics:
for the UE, the numbers of resource elements comprised in one RU, the numbers of time-domain symbols occupied by one RU, or the numbers of resource elements comprised in one RU and the numbers of time-domain symbols occupied by the one RU are the same in both of a single-tone multiple access mode and a multi-tone multiple access mode, and at least one of the number of resource elements or the number of time-domain symbols is a fixed value or determined according to a semi-static high-level configuration parameter; or
for the UE, the numbers of resource elements comprised in the RU and the numbers of time-domain symbols occupied by the RU are different in both of the single-tone multiple access mode and the multi-tone multiple access mode; and wherein
the number of resource elements and the number of time-domain symbols in each of the single-tone multiple access mode and the multi-tone multiple access mode are fixed values or determined according to the semi-static high-level configuration parameter;
or the number of resource elements or the number of time-domain symbols in the single-tone multiple access mode is read from a first set, and the number of resource elements or the number of time-domain symbols in the multi-tone multiple access mode is read from a second set; where the first set is a subset of the second set;
or the number of resource elements in the single-tone multiple access mode is an integral multiple of the number of resource elements in the multi-tone multiple access mode, or the number of time-domain symbols in the single-tone multiple access mode is an integral multiple of the number of time-domain symbols in the multi-tone multiple access mode;
or the number of resource elements in the multi-tone multiple access mode is an integral multiple of the number of resource elements in the single-tone multiple access mode, or the number of time-domain symbols in the multi-tone multiple access mode is an integral multiple of the number of time-domain symbols in the single-tone multiple access mode;
or the number of resource elements or the number of time-domain symbols in each of the single-tone multiple access mode and the multi-tone multiple access mode is a common divisor of X, where the X is a positive integer greater than a preset threshold.

18. The storage medium according to claim 17, wherein the RU is a time-frequency resource block comprising Nsc frequency-domain subcarriers and Nsym0 time-domain symbols; where the Nsym0 is the number of time-domain symbols, which is a fixed value or determined according to the semi-static high-level configuration parameter; the Nsc is an integer greater than or equal to 1;

or the RU is a time-frequency resource block comprising Nsc frequency-domain subcarriers and Nre0/Nsc time-domain symbols; where the Nre0 is the number of resource elements, which is a fixed value or determined according to the semi-static high-level configuration parameter.

19. The storage medium according to claim 18, wherein the Nsc is an element in a subset of a set $\{1, 2, 3, 4, 6, 8, 12\}$.

20. The storage medium according to claim 16, wherein the number of RUs comprises the product of a prime number less than 10 and a power of 2.

* * * * *